Sept. 5, 1950     A. B. DU MONT ET AL     2,521,571
PROJECTION SCREEN
Filed April 6, 1946
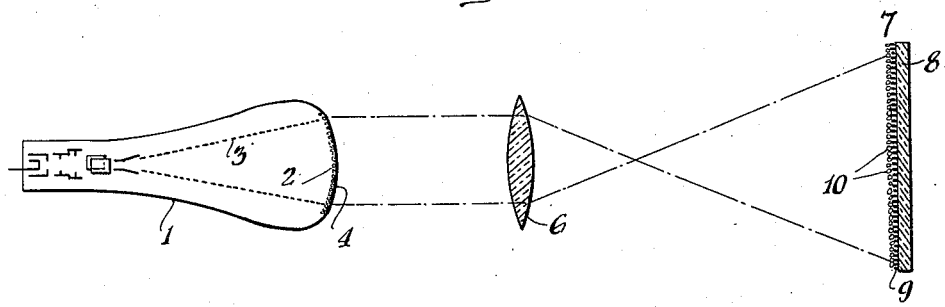
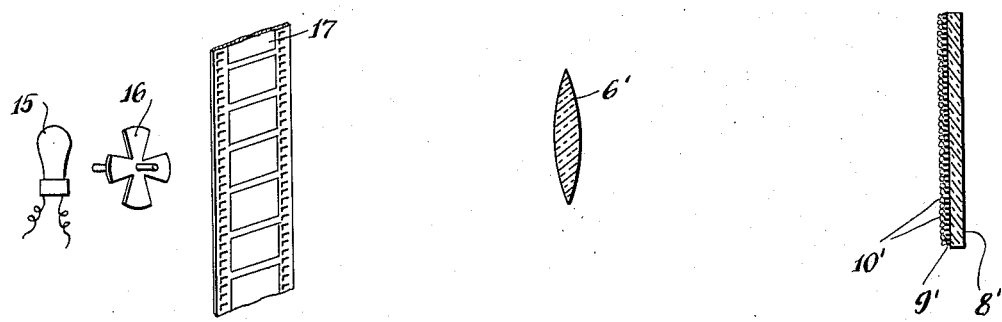
Allen B. Du Mont,
Paul Raibourn
Thomas T. Goldsmith Jr. INVENTORS
BY
Charles W. Mortimer
ATTORNEY Patented Sept. 5, 1950

2,521,571

UNITED STATES PATENT OFFICE 2,521,571

PROJECTION SCREEN

Allen B. Du Mont, Upper Montclair, N. J., Paul Raibourn, Southport, Conn., and Thomas T. Goldsmith, Jr., Cedar Grove, N. J., assignors to Allen B. Du Mont Laboratories, Inc., Passaic, N. J., a corporation of Delaware Application April 6, 1946, Serial No. 660,088

3 Claims. (Cl. 250—71)

This invention relates to the projection of radiant energy such as light upon the back side of a screen in such a manner that an audience can view scenes or patterns from the front side of said screen.

By this invention radiant energy from different sources or of different sorts, such as X-rays, infrared radiations, ultraviolet light, cosmic rays, electrons, fluorescent material excited by electrons, etc., as well as visible light can be utilized to enable scenes or patterns to be observed at a distance or by a large audience.

In carrying out the invention radiant energy is caused to impinge upon a target of variable density such as a picture film or other object that is provided with a pattern so that it will modify the radiant energy distribution of the source in order to obtain the desired pattern or picture. A screen provided with fluorescent material is utilized to convert the modified radiant energy into visible light. This screen comprises a supporting layer for the fluorescent material and a very thin layer of platinum coating having the thickness preferably of a quarter wave length of visible light to which the human eye is most sensitive.

The invention will be particularly described in connection with projection of scenes or patterns from a cathode-ray screen and the projection of moving pictures, but it is not limited to these. With this invention a moving picture film can be projected upon a screen and viewed by an audience without the necessity of using the usual very strong light.

In carrying out the invention, ultraviolet light of different intensities varying in accordance with the way it has been modified, such as by passing through picture film, or as projected from a cathode-ray tube screen, is projected upon a layer of material that fluoresces upon being struck by ultraviolet light. The fluoresence of this material varies in accordance with the different intensities of the ultraviolet light that strikes it and thereby produces corresponding different intensities of visible light.

The fluorescent material that is to be struck by the ultraviolet light is applied to a very thin layer of metal which may be in microscopic particles so that light can pass through the same. The metal layer is supported on the surface of a flat sheet of glass through which the image is viewed.

The invention may be understood from the description in connection with the accompanying drawing, in which:

Fig. 1 is a diagram of elements illustrating an embodiment of the invention; and Fig. 2 is a similar diagram showing a modification.

In the drawing, reference character 1 indicates a cathode-ray tube of the sort used for television purposes. The layer 2 on the inside surface of the large end 4 of tube 1 is a fluorescent layer of a salt that yields ultraviolet light in proportion to the intensity of the electron beam 3 that is caused to scan it. The layer 2 is scanned by the electron beam 3 in the usual way and causes ultraviolet light therefrom to pass through the large end 4 of this tube 1.

The ultraviolet light from the fluorescent material 2 which passes through the glass plate or support 4 is focussed by the lens 6, which is preferably made of quartz, upon a view screen 7.

This screen 7 comprises a clear glass plate 8 upon the back side of which, or side toward the lens 6, a very thin layer of very small particles 9 of platinum is applied. This layer is sufficiently thin to permit light to pass therethrough sufficiently easily to render the view appearing upon the layer 10 to become clearly visible. For example, it may be made thin enough to transmit about 60 percent of the light that strikes it.

A layer 10 is applied to the layer 9 and consists of fluorescent material of such a character that when energized or struck by ultraviolet light it produces visible light. This light corresponds in distribution to that on the layer 2 but is much greater in area after the conversion of ultraviolet light from layer 2 to visible light by the layer 10.

In Fig. 2 is a represented the way to project a moving picture upon a large screen by using a source of ultraviolet light.

In this modification a light bulb 15, which is of such a character that it produces ultraviolet light, is used as the source of light that is passed through the shutter 16, which is somewhat diagrammatically illustrated, and then through the moving picture film 17 that is operated in the usual way. The pictures on the film are focussed by lens 6' upon fluorescent material 10' that is on the very thin layer of very small particles 9' of platinum that are on the glass plate or support 8' which is the same as that described in connection with Fig. 1.

The ultraviolet light from the source 15 passes through the film 17, lens 6', and is projected upon the layer 10', which fluoresces with ultraviolet light, in the same way as described in connection with Fig. 1 so that visible light appears on the fluorescent layer 10'. A sufficient amount of this light passes through the very thin layer of platinum 9' to be readily seen through the glass screen or support 8' by a large audience.

The very thin layer of metal 9, such as platinum, of thickness equal to a quarter wave length of light generated by the beam 3 of electrons striking the fluorescent screen 2, has been found to increase the amount of light that is transmitted through the glass 8 or 8'.

While applicants do not wish to be committed to any particular theory for an explanation why improved results are obtained with this invention, it is believed that the improved results depend largely upon the use of the layer 9 of quarter wave thickness that is applied to the glass plate 8. This layer 9 may be platinum or it may be calcium fluoride. The improvement in the amount of transmitted light is obtained by minimizing or decreasing the phenomenon known as Fresnel reflection. A layer of quarter wave thickness of platinum or calcium fluoride may also be applied to the outside of the glass plate 8.

It has been known for some time that when glass is coated with a layer one-quarter of a wave length of light thickness, reflection of light takes place at both surfaces of such layer, and this quarter wave length thickness causes destructive interference of the light reflected from the two surfaces of the layer since a difference of length of the path of the light is equal to one-half of a wave length of the light. Therefore, practically all of the light passes through the glass 8 without any appreciable amount of the light being reflected back toward the source of light (Fundamentals of Optical Engineering by Donald H. Jacobs, pp. 118 et seq., McGraw-Hill Book Company, Inc., New York).

In other embodiments of the invention using luminescent material on a supporting surface it is advantageous to apply further thin layers of material. For example, a layer of calcium fluoride of quarter wave length thickness may be applied between the platinum layer 9 and the glass 8. In such a case the calcium fluoride layer cooperates with the black-appearing platinum layer 9 to give the useful result of providing high contrast from and good light transmission through the fluorescent material 10. The black-appearing layer 9 of platinum minimizes the disturbing effects of external illumination and yet the presence of the layer of calcium fluoride between layers 9 and 8 allows a maximum transmission of luminescent light through the assembly without contrast reduction due to internal reflections and consequent scattering.

In some cases, it is also desirable to provide a quarter wave layer of calcium fluoride or other similar performing substance to the outside of the glass or other supporting members 8 between the member 8 and the air, to reduce reflections at this surface and improve the contrast and light transmission characteristics.

Some of the advantages of this invention are that it enables a television picture or a moving picture to be viewed upon a large flat screen even through the television picture may have been received upon a small rounded or curved surface, and the moving picture may be upon the usual film; the contrast between different portions of the image is improved; the screen upon which the picture is viewed is initially dark or black due to the layer of platinum or other dark metal particles at the back of the glass screen; the source of the visible light by means of which the picture is seen is at the same screen as that upon which the picture is projected on the large scale; and the size of the picture can be changed by changing the distance between the screen 7 and lens 6.

What is claimed is:

1. Apparatus for projecting radiant energy onto a viewing screen comprising a screen having a transparent viewing surface, a transparent metallic layer on the back of said screen causing said screen to have a dark appearance said metallic layer having a thickness about one-fourth the wave length of ultra-violet light, a layer of material, which fluoresces when acted upon by ultra-violet light, on said metallic layer, and a source of ultraviolet light positioned to project said light upon said fluorescent layer.

2. The apparatus of claim 1 in which said source of ultraviolet light is a cathode ray tube having a fluorescent screen for representation of signal intelligence.

3. The apparatus of claim 1 including a film containing the picture representation positioned between said source and said screen, the representations thereon being focussed upon said screen.

ALLEN B. DU MONT.
PAUL RAIBOURN.
THOMAS T. GOLDSMITH, Jr.

REFERENCES CITED

The following references are of record in the file of this patent:

UNITED STATES PATENTS

| Number | Name | Date |
|---|---|---|
| 1,418,240 | Curie et al. | May 30, 1922 |
| 1,592,393 | Sulzberger | July 13, 1926 |
| 1,724,572 | Geisen | Aug. 13, 1929 |
| 2,026,725 | Baker | Jan. 7, 1936 |
| 2,121,990 | Schroter et al. | June 28, 1938 |
| 2,175,888 | Flory | Oct. 10, 1939 |
| 2,207,656 | Cartwright et al. | July 9, 1940 |
| 2,227,070 | DeBoer | Dec. 31, 1940 |
| 2,240,844 | Goggin et al. | May 6, 1941 |
| 2,252,770 | Janes | Aug. 19, 1941 |
| 2,397,929 | Dimmick | Apr. 9, 1946 |
| 2,401,998 | Williams | June 11, 1946 |